(12) United States Patent
Mueller

(10) Patent No.: US 11,598,391 B2
(45) Date of Patent: Mar. 7, 2023

(54) ROPE SLING SHACKLE BODY

(71) Applicants: SCHMIEDESTUECK-VERTRIEB FEUERSTEIN GMBH, Hattingen (DE); VAN BEEST INTERNATIONAL B.V., Ab Sliedrecht (NL)

(72) Inventor: Stefan Mueller, Dortmund (DE)

(73) Assignees: Schmiedestueck-Vertrieb Feuerstein GmbH, Hattingen (DE); Van Beest Group B.V., Sliedrecht (NL)

(\*) Notice: Subject to any disclaimer, the term of this patent is extended or adjusted under 35 U.S.C. 154(b) by 1075 days.

(21) Appl. No.: 16/316,632

(22) PCT Filed: Jul. 25, 2017

(86) PCT No.: PCT/DE2017/100619
§ 371 (c)(1),
(2) Date: Jan. 10, 2019

(87) PCT Pub. No.: WO2018/019334
PCT Pub. Date: Feb. 1, 2018

(65) Prior Publication Data
US 2020/0182330 A1      Jun. 11, 2020

(30) Foreign Application Priority Data
Jul. 27, 2016   (DE) .................... 10 2016 113 896.7

(51) Int. Cl.
*F16G 15/06*          (2006.01)
(52) U.S. Cl.
CPC ..................... *F16G 15/06* (2013.01)
(58) Field of Classification Search
CPC .......... F16G 15/06; F16G 15/00; F16G 15/04; Y10T 403/4336; Y10T 403/4983
(Continued)

(56) References Cited

U.S. PATENT DOCUMENTS

| | | | | |
|---|---|---|---|---|
| 2,354,280 A | * | 7/1944 | Russell | F16G 11/146 403/284 |
| 4,079,584 A | * | 3/1978 | Shahan | B21K 1/72 59/35.1 |

(Continued)

FOREIGN PATENT DOCUMENTS

JP         S54137662 U      9/1979

OTHER PUBLICATIONS

International Search Report of International Application PCT/DE2017/100619, filed Jul. 25, 2017.

*Primary Examiner* — Robert Sandy
*Assistant Examiner* — Rowland Do
(74) *Attorney, Agent, or Firm* — Muncy, Geissler, Olds & Lowe, P.C.

(57) ABSTRACT

A rope sling shackle body for a heavy load rope sling shackle for suspending on a rope sling. The shackle body includes two opposite end portions each with a through-opening for receiving a bolt, a central arc which extends between the end portions and which has, at least in a rope receiving region, an arc bottom and arc flanks that are arranged on either side thereof and are spaced apart from one another. The central arc has a convexly rounded rope supporting face on its inner side at least in the rope receiving region that extends from a top edge of one arc flank to a top edge of the other arc flank. At least one reinforcement rib is arranged between the arc flanks and is divided into two partial ribs that support the arc flanks on the arc bottom. A spacing between the partial ribs extends down to the arc bottom.

10 Claims, 4 Drawing Sheets

Figure 1:
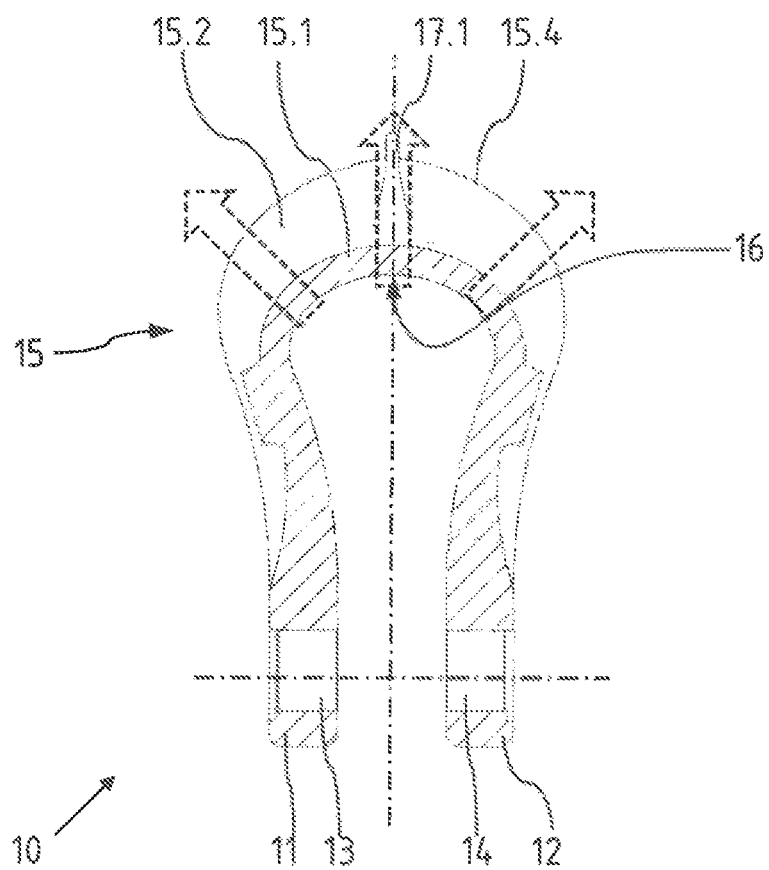

(58) Field of Classification Search
USPC .......................................................... 294/74
See application file for complete search history.

(56) References Cited

U.S. PATENT DOCUMENTS

| | | | |
|---|---|---|---|
| 5,205,793 A * | 4/1993 | Jones | F16H 55/303 |
| | | | 474/175 |
| 8,205,922 B1 * | 6/2012 | Ohman, Jr. | F16G 15/06 |
| | | | 294/82.11 |
| 2013/0147220 A1 | 6/2013 | Gaibler et al. | |

* cited by examiner

ROPE SLING SHACKLE BODY

The invention relates to a rope sling shackle body with the features of the preamble of claim 1.

Such a rope sling shackle body is known from EP 2 508 775 B1. Characteristic is a generously rounded inner side of the rope-receiving region, so that the buckling load of the rope sling is reduced as much as possible. The patent document indicates as a novelty for the Wide Body Shackle a single, central reinforcing rib, which braces the two arc flanks of the shackle arc against each other and which is to have a receptacle for a stop means. The reinforcing rib is to improve the strength of the shackle body by stiffening it transversely across the entire cross-section.

Surprisingly, it has been shown that the reinforcement tends to have a negative effect in some applications. Although a support of the arc flanks is achieved via the reinforcing rib, provided that the rope sling is hooked exactly on the vertical axis of the shackle body. The rib then reduces the deformation of the cross-section under load and consequently the tensile and compressive stresses in the cross-section.

However, as soon as a rope sling acts obliquely to the vertical axis, i.e. laterally next to the reinforcing rib connecting the two arc flanks, the cross-section is additionally loaded by additional superimposed stresses in transverse direction to the normal course of the bending stresses. While in the case of a shackle body without any reinforcing ribs the two arc flanks can move towards each other under load due to elastic deformation and the entire cross-section is uniformly loaded, in the case of a shackle with a continuous reinforcing rib the uniform and continuous deformation is impeded, as can also be seen from the dashed lines in FIG. 5 regarding the prior art, which is explained in more detail below. This creates additional tension between the not braced, i.e. more deformable, side areas of the shackle arc and the central, braced area. The shackle body can be subjected to higher loads when the load is applied obliquely than if it had no reinforcing rib at all.

The problem addressed by the present invention is, therefore, to optimize a heavy-duty rope sling shackle with regard to the course of tension with obliquely acting loads.

This problem is solved by a rope sling shackle body for a heavy-duty rope sling shackle with the features of claim 1.

According to the invention, it is intended to provide for a certain stiffening of the arc flanks in the area of the vertical central axis, which corresponds to the majority of load cases in practical applications.

On the other hand, according to the invention, the elastic deformation in the curved cross-section of the rope sling shackle body is no longer completely prevented in the center. Consequently, no superimposed additional stresses are caused in those cases in which the direction of the load action does not coincide with the vertical or central axis of the rope sling shackle body. For this purpose, according to the invention, the reinforcing rib is interrupted in the middle down to the bottom of the arc. Two aligned partial ribs are formed that each extend from the upper edge of an arc flank into the area of the arc base, but that do not touch each other and that allow a sufficiently wide free distance between them so that a deformation occurring under load in the arc base is not impeded.

Figure 2:
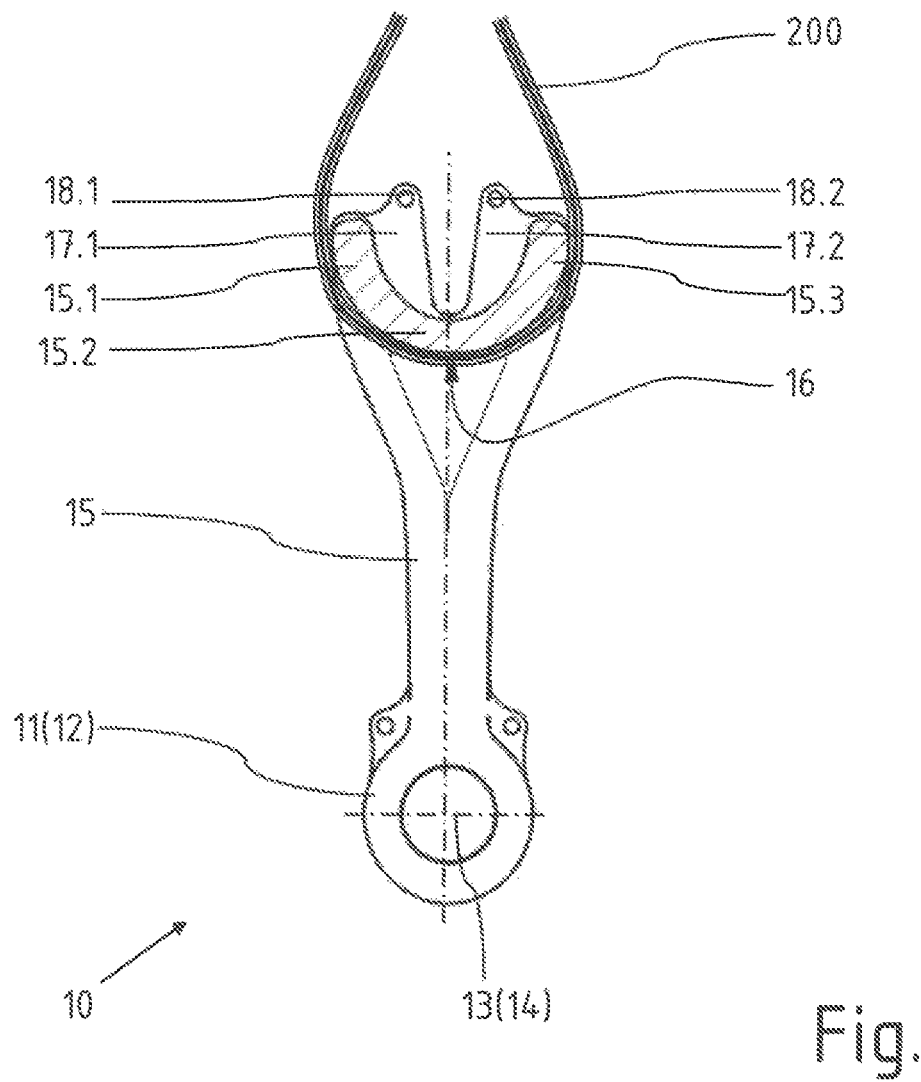
Figure 3:
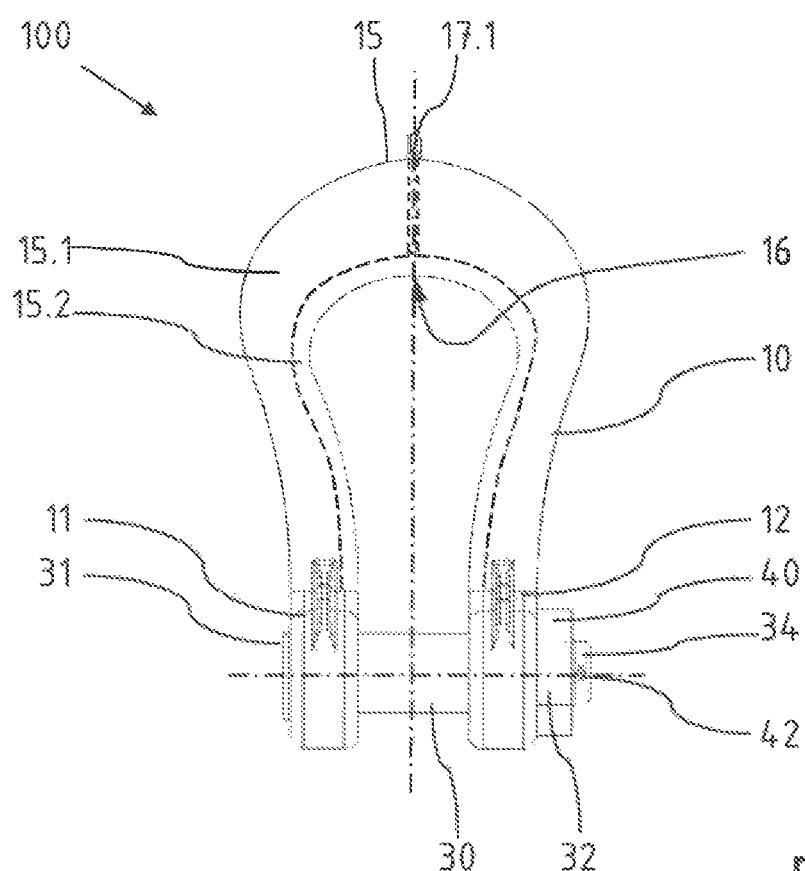
Figure 4:
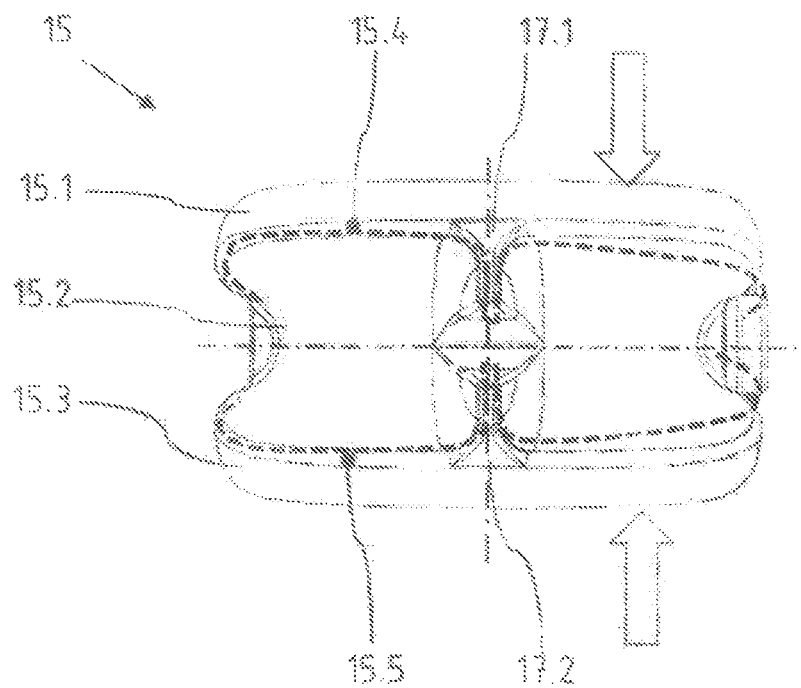
Figure 5:
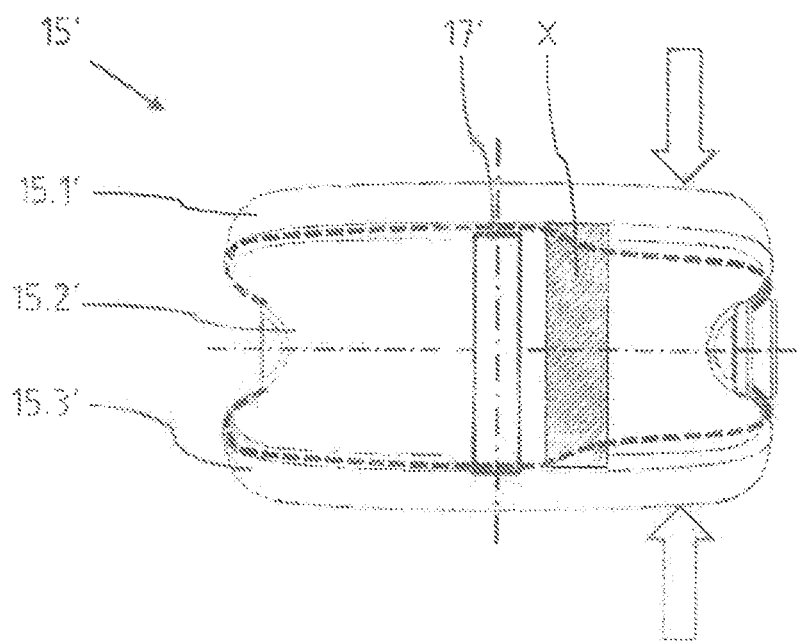

The invention is explained in greater detail based on an exemplary embodiment and with reference to the drawings. The Figures show in detail:

FIG. 1 a section through a rope sling shackle body from the front;

FIG. 2 a section through the rope sling shackle body in a side view;

FIG. 3 a heavy-duty shackle with a bolt in front view;

FIG. 4 the deformation of a rope sling shackle body with laterally acting loads according to the invention, in view from above; and FIG. 5 the deformation of a rope sling shackle body according to the prior art with laterally acting loads, in view from above.

FIG. 1 shows a rope sling shackle body 10 sectioned, in front view in a sectional plane located in the area of the vertical axis. The rope sling shackle body 10 essentially consists of an arc body 15 and two parallel end sections 11, 12, each of which has a through hole 13, 14 for receiving a shackle bolt. The upper area of the shackle arc 15, which forms a rope-receiving region 16, is horseshoe-shaped and rounded. This means that the load direction defined by the point of attack of a rope sling can lie not only vertically and centrally on the vertical axis, but also eccentrically and obliquely to it, as indicated by the block arrows.

The shackle arc 15 comprises an arc base 15.2 and two arc flanks at a distance from each other, one arc flank 15.2 of which is visible behind the section plane in FIG. 1. A partial rib 17.1 is formed only exactly on the vertical axis and fills the groove between the arc base 15.2 and the arc flank 15.1.

As the cross-sectional drawing of the rope sling shackle body 10 with a rope sling 200 in FIG. 2 shows, the cross-section in that part of the shackle arc 15 that forms the rope-receiving region 16 is strongly rounded. The sectional drawing in FIG. 2 clearly shows that the cross-sectional area has the shape of half an annular ring, so that arc flanks 15.1, 15.3 and arc base 15.2 merge smoothly and continuously into each other. The circular arc in the cross-section of the rope-receiving region 16 extends across at least 180°, in particular across 200°.

On the upper side of the shackle arc 15 facing outwards, a groove is formed which is bridged selectively by the partial ribs 17.1, 17.2, whereby the partial ribs 17.1, 17.2, however, only reach down to the bottom of the arc 15.2 towards the center.

The partial ribs 17.1, 17.2 extend beyond the upper edges 15.4, 15.5 of the arc flanks 15.1, 15.3 upwards and each have at least one receiving opening 18.1, 18.2 at the protruding portion. A smaller shackle can be attached to this, via which the rope sling shackle body 10 itself can be lifted, e.g. to attach it to a rope sling. Further receiving openings are provided at the transition of the shackle arc 15 into the end regions 11, 12.

FIG. 3 shows a fully assembled rope sling shackle 100 with a shackle bolt 30 with a head 31 and a thread section 32 inserted in the end sections 11, 12. A lock nut 40 is screwed onto the thread section 32. A cotter pin 42 is inserted at an end shoulder 34 to secure the nut 40.

FIG. 4 shows a view of the shackle arc 15 from above. The dashed lines set the course of the arc edges 15.4, 15.5 in an exaggerated manner for clarification in a deformation as caused by an eccentrically acting load represented by the block arrows. The opposite arc edges 15.4, 15.5 can move unhindered towards each other in the area of the load action by a rope sling located there. To the left there is a very gradual and steady decrease in deformation.

For comparison, a prior art rope sling shackle 10' with a continuous reinforcing rib 17' in the middle is shown in FIG. 5. Its cross-section in the area of a shackle arc 15' also includes a central arc base 15.2' and laterally adjoining arc flanks 15.1', 15.3'. As soon as a rope sling acts obliquely to the vertical axis, i.e. laterally outside the area of a reinforcing rib 17', which directly connects the two arc flanks 15.1', 15.3' to each other, the cross-section is loaded by additional superimposed stresses.

While the two arc flanks according to the invention could move towards each other under load by elastic deformation, according to the prior art this is prevented or at least impeded by the centrally arranged reinforcing rib 17'. This results in additional and differently oriented stresses, especially in the area marked "X" next to the reinforcing rib 17'. The rope sling shackle body 10' is therefore effectively subjected to a higher load with an obliquely acting load than if it had no reinforcing rib 17' at all.

The invention claimed is:

1. A rope sling shackle body for a heavy-duty rope sling shackle for attachment to a rope sling, comprising:
   two opposed end portions each having a through-opening for receiving a bolt; and
   a central arc that extends between the end sections and that, at least in a rope-receiving region, further comprises:
      an arc base and arc flanks arranged on both sides of the arc base and being spaced apart from one another, wherein an inner side of the central arc has a convexly curved rope support area at least in the rope receiving region that extends from an upper edge of a first one of the arc flanks to an upper edge of a second one of the arc flanks; and
      at least one reinforcing rib arranged between the arc flanks, wherein the at least one reinforcing rib is divided into a first partial rib and a second partial rib, via each of which a respective one of the arc flanks is supported on the arc base, and there being a distance between the first and second partial ribs that extends down to the arc base.

2. The rope sling shackle body of claim 1, wherein the first and second partial ribs each having a protruding part that extends upwards beyond the upper edges of the arc flanks and each protruding part having at least one receiving opening.

3. The rope sling shackle body of claim 2, wherein the arc flanks and the arc base together form a torus inner ring section in the rope-receiving region.

4. The rope sling shackle body of claim 2, wherein inner edges of the first and second partial ribs facing each other are formed in a straight line.

5. The rope sling shackle body of claim 4, wherein the arc flanks and the arc base together form a torus inner ring section in the rope-receiving region.

6. A rope sling shackle for attaching a rope sling, comprising:
   at least one rope sling shackle body of claim 2; and
   a bolt inserted into the through-openings, the bolt comprising a head at a first end and a threaded portion at a second end, wherein the second end receives a locking nut.

7. The rope sling shackle body of claim 1, wherein inner edges of the first and second partial ribs facing each other are formed in a straight line.

8. The rope sling shackle body of claim 7, wherein the arc flanks and the arc base together form a torus inner ring section in the rope-receiving region.

9. The rope sling shackle body of claim 1, wherein the arc flanks and the arc base together form a torus inner ring section in the rope-receiving region.

10. A rope sling shackle for attaching a rope sling, comprising:
    at least one rope sling shackle body of claim 1; and
    a bolt inserted into the through-openings, the bolt comprising a head at a first end and a threaded portion at a second end, wherein the second end receives a locking nut.

* * * * *